US012219330B2

(12) United States Patent
Yamamoto

(10) Patent No.: US 12,219,330 B2
(45) Date of Patent: Feb. 4, 2025

(54) SOUND OUTPUT DEVICE

(71) Applicant: DENSO ELECTRONICS CORPORATION, Anjo (JP)

(72) Inventor: Chikara Yamamoto, Anjo (JP)

(73) Assignee: DENSO ELECTRONICS CORPORATION, Anjo (JP)

( * ) Notice: Subject to any disclaimer, the term of this patent is extended or adjusted under 35 U.S.C. 154(b) by 129 days.

(21) Appl. No.: 17/835,708

(22) Filed: Jun. 8, 2022

(65) Prior Publication Data

US 2022/0303679 A1   Sep. 22, 2022

Related U.S. Application Data

(63) Continuation of application No. PCT/JP2020/045101, filed on Dec. 3, 2020.

(30) Foreign Application Priority Data

Dec. 25, 2019 (JP) .................. 2019-235154

(51) Int. Cl.
| | | |
|---|---|---|
| *H04R 3/04* | (2006.01) | |
| *B60Q 5/00* | (2006.01) | |
| *H04R 1/28* | (2006.01) | |

(52) U.S. Cl.
CPC .............. *H04R 3/04* (2013.01); *B60Q 5/008* (2013.01); *H04R 1/2803* (2013.01); *H04R 2499/15* (2013.01)

(58) Field of Classification Search
CPC .... H04R 3/04; H04R 1/2803; H04R 2499/15; G10K 15/02
USPC ...................... 381/58, 86, 98–99, 79, 61, 63
See application file for complete search history.

(56) References Cited

U.S. PATENT DOCUMENTS

| | | | | |
|---|---|---|---|---|
| 5,635,903 | A * | 6/1997 | Koike .................... | B60Q 5/008 340/384.1 |
| 7,801,315 | B2 * | 9/2010 | Watanabe .............. | H04R 1/323 381/80 |
| 8,730,020 | B2 * | 5/2014 | Konet .................... | G10K 15/02 340/384.1 |
| 9,036,827 | B2 * | 5/2015 | Pompei ................... | H04R 3/12 367/181 |
| 10,720,139 | B2 * | 7/2020 | Seagriff ............... | G10K 11/178 |
| 10,736,535 | B2 * | 8/2020 | Elberling ................ | A61B 5/38 |
| 11,039,244 | B2 * | 6/2021 | Port ........................ | G06F 3/165 |
| 11,062,690 | B2 * | 7/2021 | De Cesaris ........... | G10K 15/04 |
| 11,351,916 | B2 * | 6/2022 | Bastyr .................... | B60Q 5/008 |
| 2012/0130580 | A1 | 5/2012 | Omote et al. | |

(Continued)

FOREIGN PATENT DOCUMENTS

| | | |
|---|---|---|
| JP | 2007203924 A | 8/2007 |
| JP | 2009042843 A | 2/2009 |

(Continued)

*Primary Examiner* — Disler Paul
(74) *Attorney, Agent, or Firm* — Harness, Dickey & Pierce, P.L.C.

(57) ABSTRACT

A sound output device includes a waveform output unit and a sounding body. The waveform output unit is configured to output a sound waveform that includes a second waveform generated by a frequency modulation to a first waveform having a desired center frequency. The sounding body is configured to generate a sound corresponding to the sound waveform output from the waveform output unit.

9 Claims, 4 Drawing Sheets

(56) References Cited

U.S. PATENT DOCUMENTS

2017/0373656 A1* 12/2017 Bharitkar ................. H04R 3/04
2019/0009717 A1    1/2019 Nagasawa et al.

FOREIGN PATENT DOCUMENTS

| JP | 2011183979 A | 9/2011 |
| JP | 2012171462 A | 9/2012 |
| WO | WO-2011148534 A1 | 12/2011 |
| WO | WO-2017125990 A1 | 7/2017 |

* cited by examiner

SOUND OUTPUT DEVICE

CROSS REFERENCE TO RELATED APPLICATIONS

The present application is a continuation application of International Patent Application No. PCT/JP2020/045101 filed on Dec. 3, 2020, which designated the U.S. and claims the benefit of priority from Japanese Patent Application No. 2019-235154 filed on Dec. 25, 2019. The entire disclosures of all of the above applications are incorporated herein by reference.

TECHNICAL FIELD

The present disclosure relates to a sound output device.

BACKGROUND

In recent years, since electric vehicles (EV vehicles) and hybrid vehicles (HV vehicles) are structurally less noisy and it is difficult for pedestrians to notice the approach of these vehicles, some vehicles have a vehicle approach notification device that emits a vehicle approach notification sound such as a pseudo-engine sound or a pseudo-motor sound in order to raise awareness for the approaching vehicles.

SUMMARY

The present disclosure provides a sound output device including a waveform output unit and a sounding body. The waveform output unit is configured to output a sound waveform that includes a second waveform generated by a frequency modulation to a first waveform having a desired center frequency. The sounding body is configured to generate a sound corresponding to the sound waveform output from the waveform output unit.

BRIEF DESCRIPTION OF DRAWINGS

Objects, features and advantages of the present disclosure will become apparent from the following detailed description made with reference to the accompanying drawings. In the drawings:

FIG. 4 is a diagram showing frequency characteristics of a modulated wave and the like;

DETAILED DESCRIPTION

Figure 1:
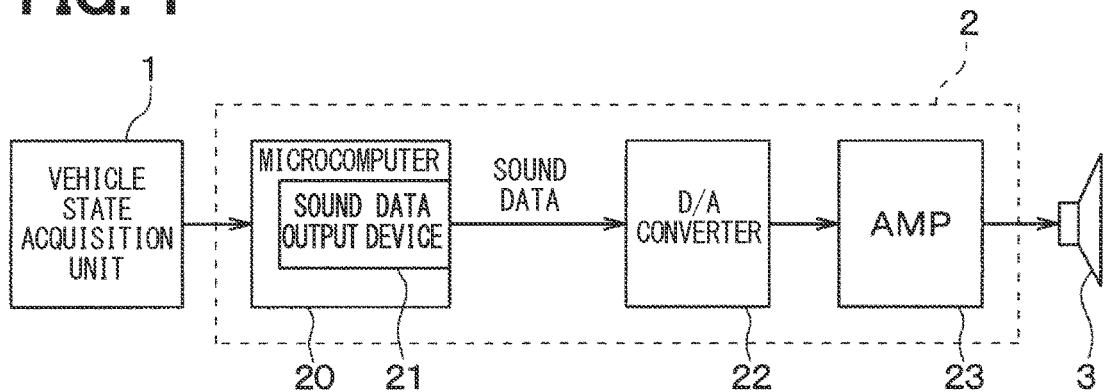
FIG. 1 is a block diagram of an approach notification system for a vehicle described in a first embodiment.

For vehicle notification sounds, for example, regulations of vehicle approach notification such as UN-R138 and FMVSS141 stipulate the minimum value of a sound pressure that vehicles should produce. As for a method of measuring the sound pressure, a microphone position assuming a listening position with respect to a vehicle position is stipulated.

By fixing a positional relationship between the vehicle and the microphone in this way, positional relationships between a sounding body mounted inside the vehicle and a structure, a road surface, and the like around a mounting position of the sounding body are fixed. In such a situation, a direct wave and a reflected wave of the notification sound may have opposite phases, and the sound pressure may drop at a specific frequency, that is, a dip may occur.

A notification sound for vehicles according to a comparative example is a set of narrow band components composed of a fundamental tone and harmonic overtones. Therefore, there is concern that a dip frequency at which a dip occurs and the frequency of the narrow band component contributing to the sound pressure of the notification sound overlap and the sound pressure drops.

A sound output device according to one aspect of the present disclosure includes a waveform output unit configured to output a sound waveform that includes a second waveform generated by performing a frequency modulation to a first waveform having a desired center frequency, and a sounding body configured to generate a sound corresponding to the sound waveform output from the waveform output unit.

According to the above configuration, since the sound corresponding to the second waveform obtained by performing the frequency modulation to the first waveform is output, the frequency of the sound is widened as compared with a case where only the sound corresponding to the first waveform is output, for example. Therefore, even if the frequency of the sound and a dip frequency overlap, the attenuation of the sound pressure is reduced and a stable sound pressure can be obtained.

The following describes embodiments of the present disclosure with reference to the drawings. In the following embodiments, the same or equivalent parts are denoted by the same reference numerals for description.

First Embodiment

The following describes a first embodiment. In the present embodiment, a case where a sound output device is applied to a vehicle approach notification device will be described as an example. FIG. 1 is a block diagram of a vehicle approach notification system including a vehicle approach notification device according to the present embodiment. The vehicle approach notification system including the vehicle approach notification device according to the present embodiment will be described with reference to this figure.

As shown in FIG. 1, the vehicle approach notification system has a configuration including a vehicle state acquisition unit 1, a vehicle approach notification device 2 as a waveform output unit, and a speaker 3 as a sounding body. In the vehicle approach notification system, the vehicle approach notification device 2 outputs a sound waveform based on a detection signal from the vehicle state acquisition unit 1, and the speaker 3 outputs a sound corresponding to the sound waveform output from the vehicle approach notification device 2 to notify the approach of the vehicle to surrounding pedestrians and the like.

The vehicle state acquisition unit 1 includes various sensors such as a vehicle speed sensor, an accelerator opening sensor, and a shift position sensor, and outputs a vehicle speed detection signal, an accelerator opening signal, and a vehicle shift position signal as traveling state detection signals of the vehicle.

The vehicle approach notification device 2 receives the traveling state detection signal from the vehicle state acquisition unit 1 to acquire information on a vehicle speed, an accelerator opening, and a shift position, and outputs a sound waveform corresponding to the notification sound for notifying the approach of the vehicle when the vehicle is traveling at a low speed (for example, 20 km/h or less) with little road noise.

The vehicle approach notification device 2 includes a microcomputer 20, a digital/analog converter (hereinafter referred to as a D/A converter) 22, and a power amplifier (hereinafter referred to as AMP) 23.

The microcomputer 20 functions as a controller having a sound data output device 21. Although not shown, the microcomputer 20 is configured to include I/O and the like in addition to a CPU corresponding to a processor, and a ROM and a RAM corresponding to a memory. The memory stores a sound control program, sound data of the notification sound, data for setting a sampling cycle and a volume, and the like. The microcomputer 20 reads out the sound data at each sampling cycle, sets the sound data in the sound data output device 21, and outputs the sound data. The sound data output device 21 outputs sound data using PWM or serial communication.

In the present embodiment, sound data having a wide frequency band is stored in the memory of the microcomputer 20. The sound data is generated by the following procedure. First, a center frequency is determined according to a frequency band in which a sound pressure is desired to be output in the notification sound. Next, a first waveform having this desired center frequency is selected. As the first waveform, it is desirable that the amplitude and frequency are constant regardless of time, and for example, a sine wave is selected. Then, the first waveform is frequency-modulated (FM modulation) to generate a second waveform, and sound data is generated so that the sound waveform including the second waveform is output from the vehicle approach notification device 2.

The modulation factor of the frequency modulation is set so that the modulation width obtained by multiplying the center frequency by the modulation factor has a desired bandwidth. For example, the modulation factor is set so that the modulation width is ⅓ octave band or more, or more than the width of the predicted dip frequency. If the modulation width is too large, the notification sound is heard as a sound having a frequency far from the center frequency. Therefore, it is desirable to set the modulation factor so that the modulation width is, for example, 30% or less.

Further, the modulation frequency is adjusted to a frequency at which the fluctuation intensity (vacil) becomes small and a listener is less likely to have a sense of discomfort due to a change in pitch, for example, 30 Hz or higher.

When the sound data output device 21 uses a PWM output represented as a pulsed digital signal, the D/A converter 22 is configured as a filter unit that converts the PWM output into an analog signal. For example, when the filter unit includes a resistor, a capacitor, or the like, the capacitor is charged and discharged based on the pulsed PWM output, so that an analog signal corresponding to a PWM frequency and a duty ratio of the PWM output is output. Accordingly, the analog signal of the output waveform corresponding to the sound data is demodulated.

The AMP 23 applies an output voltage corresponding to the analog signal output from the D/A converter 22 to the speaker 3. Accordingly, the output voltage for reproducing sound data according to the vehicle traveling state is applied to the speaker 3, and sound is generated from the speaker 3 according to the applied output voltage. Although it has been described here that the output voltage corresponding to the analog signal is applied to the speaker 3 from the AMP 23, an output current may also be used.

The vehicle approach notification system of the present embodiment is configured as described above. In the vehicle approach notification system, the sound data is output from the microcomputer 20 according to the vehicle traveling state, and the output voltage corresponding to the sound data output is applied to the speaker 3, so that sounding is performed according to the vehicle traveling state.

For such a vehicle approach notification system, the regulations stipulate the minimum sound pressure that vehicles should produce. When a sound pressure is measured, a positional relationship between the vehicle and a microphone is fixed, so that positional relationships between the speaker 3 and a structure, a road surface, and the like around a mounting position of the speaker 3 are fixed.

Figure 2:
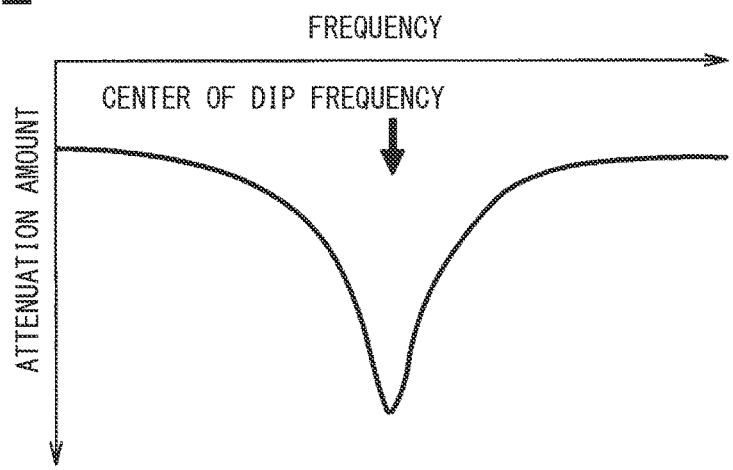
FIG. 2 is a diagram showing characteristics of a dip.
Figure 3:
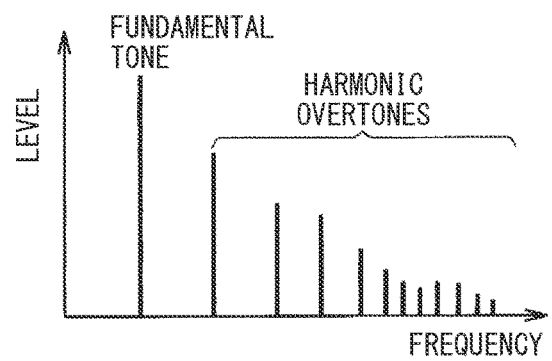
FIG. 3 is a diagram showing frequency components of a notification sound according to a comparative example.

In such a situation, as shown in FIG. 2, a direct wave and a reflected wave of the notification sound may have opposite phases and the sound pressure may drop at a specific frequency, that is, a dip may occur. For example, as shown in FIG. 3, in a notification sound according to a comparative example that is composed of narrow band components of a fundamental tone and harmonic overtones, the sound pressure may decrease due to the overlap between the frequency of the notification sound and the dip frequency. Since the specified microphone position is intended for a position of a listener, especially a pedestrian, it is important to improve the measurement result of the sound pressure in order to improve the recognition of the notification sound.

Further, in such a vehicle approach notification system, the vehicle approach notification device 2 performs a frequency shift for imitating a traveling sound according to the vehicle speed. In such a case, it is difficult to generate a sound with avoiding the dip frequency, and the sound pressure drops sharply at a specific vehicle speed, which may make it impossible to satisfy the regulations of the minimum sound pressure.

Further, if the sound output is increased in order to satisfy the regulations, a sound transmitted into the vehicle interior increases, which may cause noise to a driver. In addition, a sounding device having a larger physique is required, which may lead to an increase in cost and deterioration of vehicle mountability.

On the other hand, in the present embodiment in which the notification sound is widened as described above, the attenuation of the sound pressure is reduced even if the frequency of the notification sound and the dip frequency overlap due to the vehicle mounting environment of the speaker 3 and the reflection by the road surface.

Figure 4:
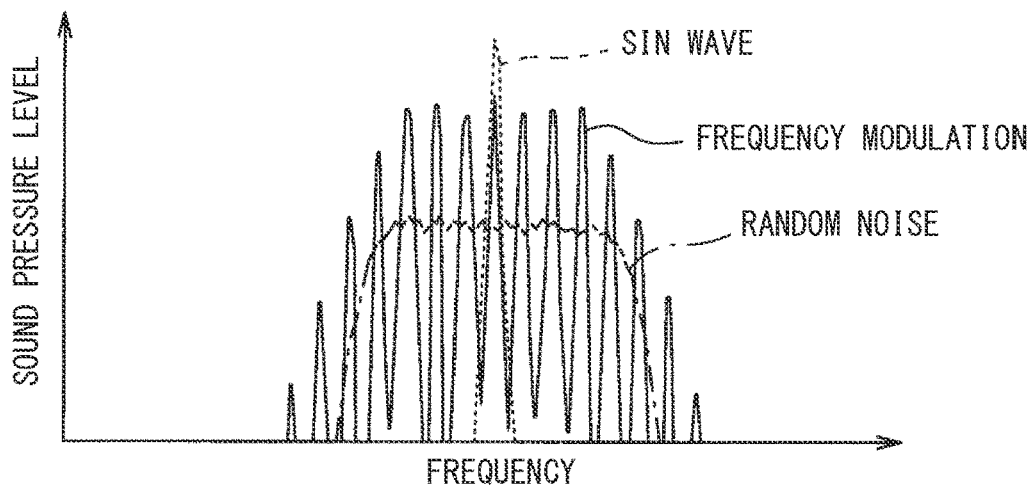
Figure 5:
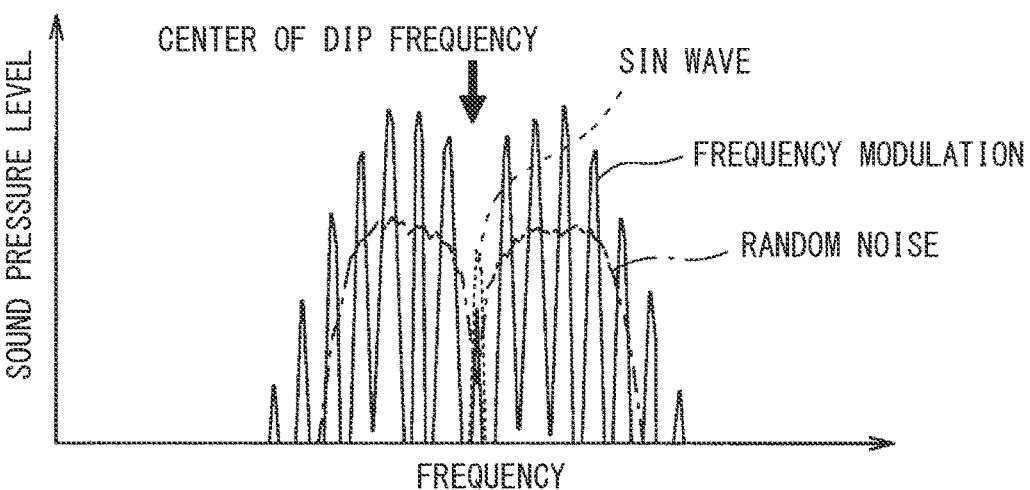
FIG. 5 is a diagram showing changes in frequency characteristics of a modulated wave and the like due to a dip.
Figure 6:
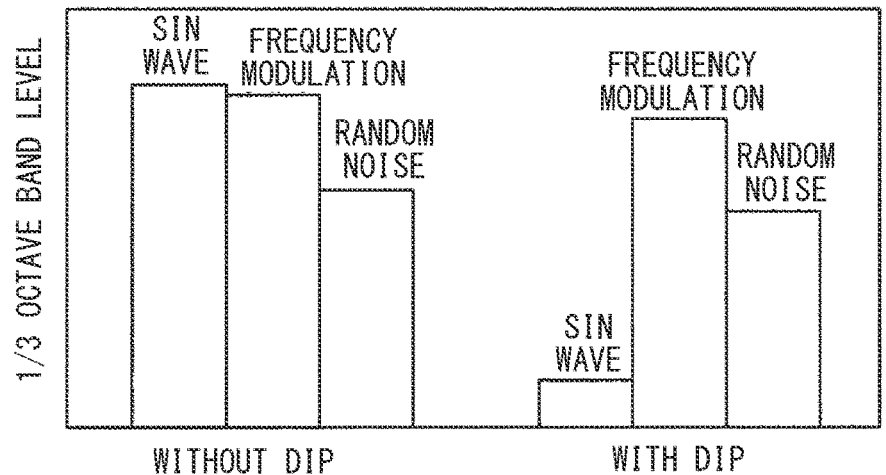
FIG. 6 is a diagram showing changes in ⅓ octave band level due to a dip.

FIGS. 4 to 7 are diagrams for explaining the effect of the present embodiment, and show the results of FFT analysis and the like performed by the present inventor. The modulated wave in FIGS. 4 to 7 is a second waveform obtained by frequency modulation using the sine wave as the first waveform. As shown in FIG. 4, the modulated wave has a wider band than the sine wave, and the sound pressure is larger than random noise. When a dip of the sound pressure occurs and the center frequency and the dip frequency overlap, the sound pressure of the sine wave drops significantly as shown in FIGS. 5 and 6, whereas the sound pressure of the modulated wave is maintained by non-overlapping frequency components that do not overlap with the dip frequency.

Further, it is possible to suppress a decrease in sound pressure efficiency by using the frequency modulation in which the amplitude of the first waveform is maintained. As shown in FIG. 6, when there is no dip, the ⅓ octave band levels of the sine wave as the first waveform and the modulated wave are almost the same.

Figure 7:
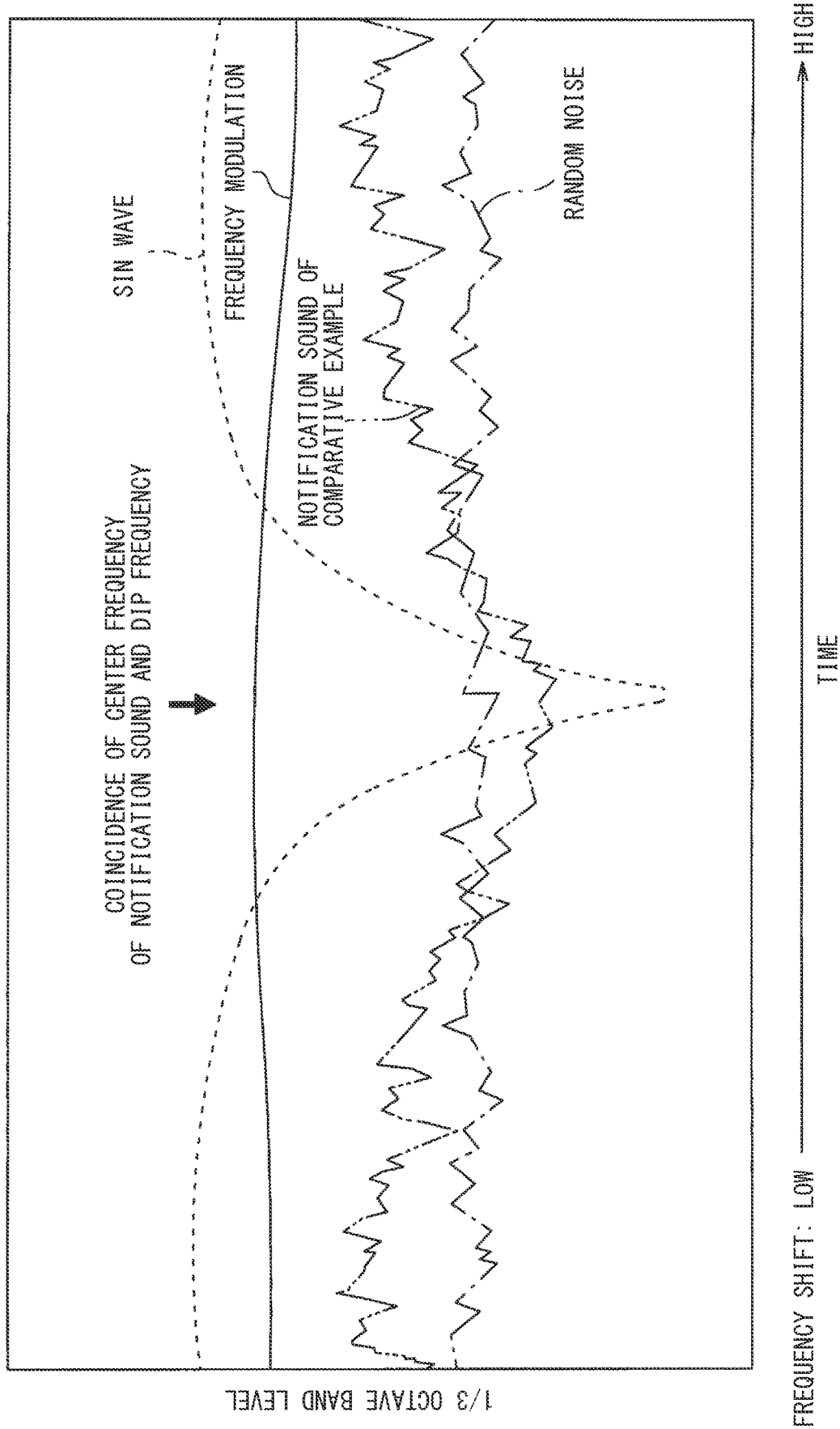
FIG. 7 is a diagram showing a sound pressure fluctuation due to a dip when accompanied by a frequency shift.

Further, even when a frequency shift is involved, the sound pressure can be expected to be stabilized in the present embodiment. FIG. 7 shows the analysis result of the ⅓ octave band level when the frequency shift is increased with the passage of time. As shown in FIG. 7, for the notification sound composed of the sine wave, since it has a single frequency, the influence of the dip is large, and the sound pressure is greatly reduced. For the notification sound according to the comparative example, the narrow band components of the fundamental tone and the harmonic overtones are affected by the dip, the sound pressure decreases, and the sound pressure fluctuates with time. For the random noise, it is less likely to be affected by the dip, but the sound pressure efficiency is low. On the other hand, for the notification sound corresponding to the second waveform obtained by the frequency modulation, the influence of the dip is small and the sound pressure is maintained. In addition, the fluctuation of the sound pressure with time is small, and the sound pressure efficiency is high.

As described above, in the present embodiment, by widening the frequency of the notification sound by the frequency modulation, the attenuation of the sound pressure due to the dip is reduced, and a stable sound pressure can be obtained.

Further, if the sound pressure of the notification sound fluctuates with time due to the amplitude fluctuation of the sound waveform, sufficient sound pressure may not be obtained depending on the timing at which the traveling vehicle passes. Therefore, it is desired to reduce the amplitude fluctuation as much as possible, but it is difficult to individually adjust the amplitude fluctuation of the fundamental tone and the harmonic overtone components constituting the notification sound according to the comparative example.

On the other hand, in the present embodiment, by selecting a waveform having no amplitude or frequency fluctuation with time as the first waveform, it is possible to suppress the fluctuation of the sound pressure of the second waveform with time and maintain a constant amplitude. This makes it possible to reduce the sound pressure fluctuation of the notification sound emitted from the traveling vehicle, for example, the vehicle approach notification sound, and to suppress the sound pressure fluctuation depending on the timing at which the vehicle passes.

In addition, since the dip frequency changes due to manufacturing variations of vehicles and devices, temperature fluctuations, and the like, the improvement of robustness is desired to ensure stable sound pressure and improve the recognition of the notification sound toward the outside of the vehicle.

Regarding the above point, in the present embodiment, by widening the frequency of the notification sound, stable sound pressure can be obtained even when the dip frequency fluctuates due to disturbance, and the recognition of the notification sound can be improved.

Further, in the present embodiment, the output of a reproduction device such as a speaker or an amplifier can be suppressed by improving the sound pressure efficiency. As a result, it is possible to reduce unnecessary transmitted sound into the vehicle interior, reduce the cost for noise control, and reduce the size of the reproduction device, so as to improve the vehicle mountability and cost. Further, by the frequency modulation, it is possible to prevent the sound from being concentrated in the frequency band that easily propagates in the vehicle interior, and to further reduce unnecessary transmitted sound.

Further, due to the high sound pressure efficiency, there is a lot of room for adding other frequency components, so that the degree of freedom of the timbre is increased. Further, since the fluctuation of the sound pressure level with time is small, the notification sound can be configured by a loop sound having a short recording time, and the memory capacity required for storing the waveform data can be reduced.

When the notification sound is emitted from the speaker mounted inside the vehicle, since the sound propagation path is different on the left and right sides of the vehicle, the dip frequency may be different on the left and right sides. In such a case, in the present embodiment, the difference between the left and right sound pressures can be reduced by stabilizing the sound pressure of the notification sound on each of the left and right sides.

Other Embodiments

The present disclosure is not limited to the above described embodiments and may be suitably modified.

Figure 8:
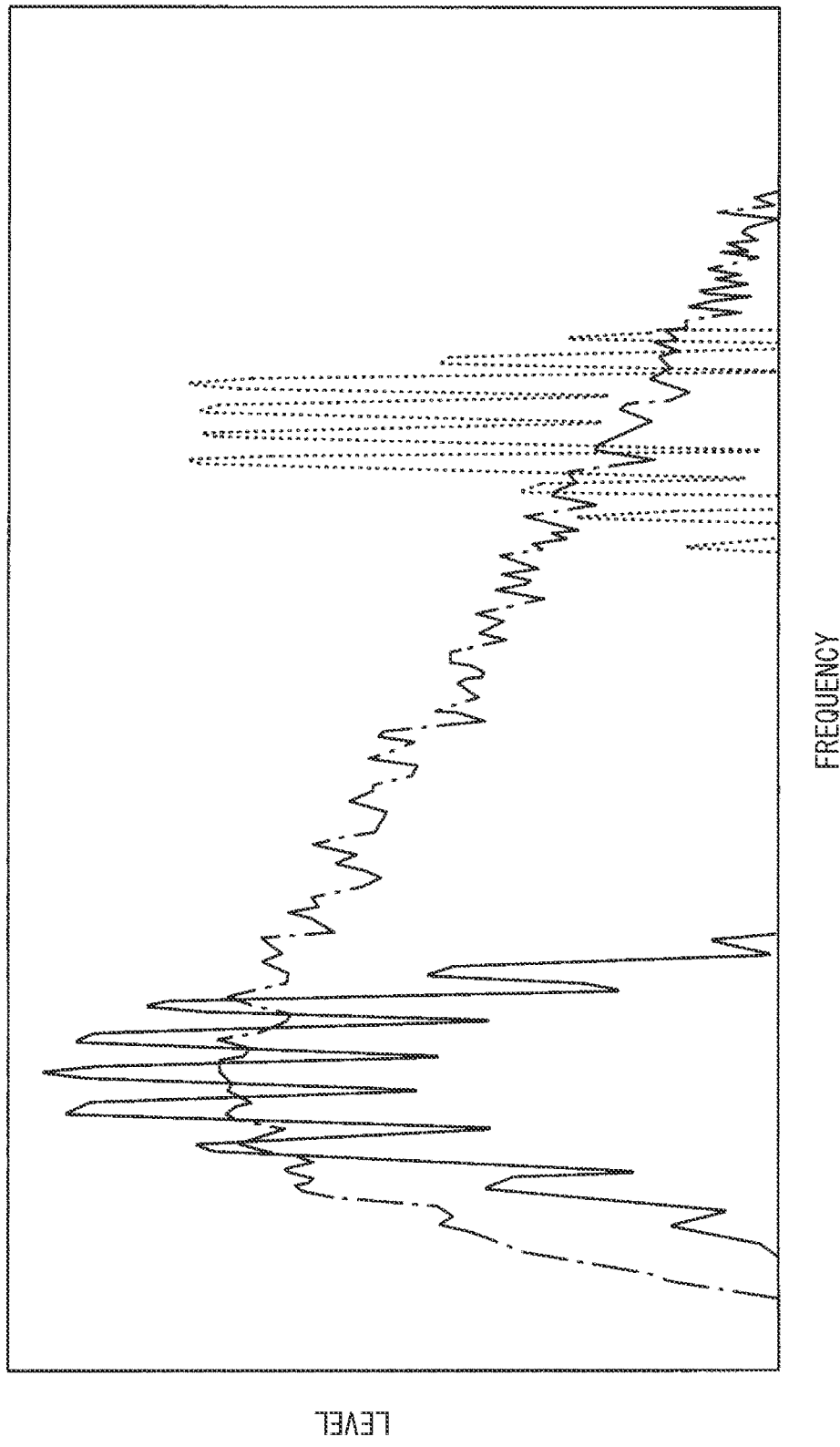
FIG. 8 is a diagram showing a frequency component of a notification sound in another embodiment.

For example, in the above embodiment, the sine wave is used as the first waveform, but another waveform may be used as the first waveform. The sound waveform may be configured only by the second waveform, or the sound waveform may include a sine wave, random noise, or the like in addition to the second waveform. As the random noise, for example, pink noise as shown in FIG. 8 may be used. As shown in FIG. 8, the sound waveform may be configured so that multiple second waveforms are included. The solid line and the broken line in FIG. 8 indicate two modulated waves, and the alternate long and short dash line indicates pink noise.

The sound waveform may include the second waveform to which an acoustic effect such as reverberation is applied so as to be preferable in terms of hearing within a range in which the frequency component distribution does not change. In order to make the timbre of the notification sound preferable in terms of hearing, a sound waveform may be formed by combining the second waveform and a narrow band component such as a musical sound.

Each frequency component obtained by the frequency modulation may be combined (mixed down) into one sound data, or each frequency component may be input into a device capable of sounding independently and simultaneously. The present disclosure may be applied to a sound output device other than the approach notification device for vehicles.

Hereinafter, various aspects of the present disclosure will be described.

A sound output device according to one aspect of the present disclosure includes a waveform output unit configured to output a sound waveform that includes a second waveform generated by a frequency modulation to a first waveform having a desired center frequency, and a sounding body configured to generate a sound corresponding to the sound waveform output from the waveform output unit.

According to the above configuration, since the sound corresponding to the second waveform obtained by the frequency modulation to the first waveform is output, the frequency of the sound is widened as compared with a case where only the sound corresponding to the first waveform is output, for example. Therefore, even if the frequency of the sound and a dip frequency overlap, the attenuation of the sound pressure is reduced and a stable sound pressure can be obtained.

The modulation factor of the frequency modulation may be set so that the modulation width is, for example, ⅓ octave or more.

By increasing the modulation width in this way, the width of the frequency band of the second waveform becomes wider than the width of the dip frequency, and the attenuation of the sound pressure can be further reduced.

The first waveform may be a waveform that does not fluctuate with time in amplitude and frequency, and may be, for example, a sine wave.

Accordingly, it is possible to suppress the fluctuation of the sound pressure of the second waveform with time and maintain a constant amplitude. For example, in the notification sound emitted from a traveling vehicle, it is possible to reduce the sound pressure fluctuation and suppress the sound pressure fluctuation due to the timing at which the vehicle passes.

The modulation frequency of the frequency modulation may be 30 Hz or higher.

By increasing the modulation frequency in this way, the fluctuation intensity is reduced, and the listener is less likely to have a sense of discomfort due to the change in pitch.

The waveform output unit may be configured to output a sound waveform including random noise.

By adding random noise in this way, the attenuation of sound pressure due to dipping can be further reduced.

What is claimed is:

1. A sound output device comprising:
   a waveform output unit configured to
      acquire information relative to a traveling state of a vehicle from an external sensor,
      determine whether the vehicle is traveling at a speed lower than a predetermined speed based on the information relative to the traveling state,
      in response to determining that the vehicle is traveling at the speed lower than the predetermined speed, determine a center frequency within an audible frequency band according to a frequency band in which a sound pressure is desired to be output as a notification sound for notifying approach of the vehicle, set a first waveform having the center frequency, widen a frequency of the first waveform by a frequency modulation to generate a second waveform having a frequency within the audible frequency band, and output a sound data indicating a sound waveform including the second waveform; and
   a sounding body configured to receive a voltage or a current corresponding to the sound data, and generate a sound corresponding to the voltage or the current as the notification sound.

2. The sound output device according to claim 1, wherein a modulation factor of the frequency modulation is set so that a modulation width is ⅓ octave or more.

3. The sound output device according to claim 1, wherein the first waveform is a waveform whose amplitude and frequency are constant regardless of time.

4. The sound output device according to claim 3, wherein the first waveform is a sine wave.

5. The sound output device according to claim 1, wherein a modulation frequency of the frequency modulation is set to be 30 Hz or higher.

6. The sound output device according to claim 1, wherein the waveform output unit is configured to output the sound waveform including random noise.

7. The sound output device according to claim 1, wherein the first waveform is a single-frequency sine wave, and the second waveform generated by performing the frequency modulation to the first waveform is a multi-frequency wave that has a same center frequency as the center frequency of the first waveform.

8. A sound output device comprising:
   a microcomputer including a processor and a memory, the memory storing a program configured to, when executed by the processor, cause the processor to
      acquire information relative to a traveling state of a vehicle from an external sensor,
      determine whether the vehicle is traveling at a speed lower than a predetermined speed based on the information relative to the traveling state,
      in response to determining that the vehicle is traveling at the speed lower than the predetermined speed, determine a center frequency within an audible frequency band according to a frequency band in which a sound pressure is desired to be output as a notification sound for notifying approach of the vehicle, set a first waveform having the center frequency, widen a frequency of the first waveform by a frequency modulation to generate a second waveform having a frequency within the audible frequency band, and output a sound data indicating a sound waveform including the second waveform; and
   a speaker configured to receive a voltage or a current corresponding to the sound data, and generate a sound corresponding to the voltage or the current as the notification sound.

9. The sound output device according to claim 8, wherein the first waveform is a single-frequency sine wave, and the second waveform generated by performing the frequency modulation to the first waveform is a multi-frequency wave that has a same center frequency as the center frequency of the first waveform.

* * * * *